(12) United States Patent
Newberg et al.

(10) Patent No.: US 6,175,672 B1
(45) Date of Patent: Jan. 16, 2001

(54) RF WIDE BANDWIDTH LOSSLESS HIGH PERFORMANCE LOW NOISE TRANSMISSIVE LINK

(75) Inventors: Irwin L. Newberg, Pacific Palisades; Robert R. Hayes, Calabasas; Kapriel V. Krikorian, Agoura; Robert Y. Loo, Agoura Hills; Willie W. Ng, Agoura Hills; Robert A. Rosen, Agoura Hills, all of CA (US)

(73) Assignee: Raytheon Company, Lexington, MA (US)

( * ) Notice: Under 35 U.S.C. 154(b), the term of this patent shall be extended for 0 days.

(21) Appl. No.: 09/336,264

(22) Filed: Jun. 18, 1999

(51) Int. Cl.$^7$ ..................................................... G02B 6/28
(52) U.S. Cl. ..................................... 385/24; 385/1; 385/4; 385/31; 385/43; 385/45; 359/154; 359/183; 359/189
(58) Field of Search ........................ 385/24, 1–4, 14–15, 385/31, 11, 27, 42–45; 359/183, 189, 180, 154

(56) References Cited

U.S. PATENT DOCUMENTS 5,473,459 * 12/1995 Davis ................................. 385/14 X
5,933,265 * 12/1995 Nagarajan ............................ 359/189

* cited by examiner

*Primary Examiner*—Phan T. H. Palmer
(74) *Attorney, Agent, or Firm*—Leonard A. Alkov; Glenn H. Lenzen, Jr.

(57) ABSTRACT

A substantially lossless transmissive link, such as an RF fiber optic link, that selectively employs a number of techniques to improve various link parameters. The link may be structured to comprise a high power light source, such as a laser, that provides light output having a high level of optical power. A feedback circuit may be disposed around the light source that reduces relative-intensity-noise levels produced by the light source at low frequencies. A modulator is provided that modulates the light output of the light source. Preferably, a dual output modulator may be used to provide two modulated optical signals whose respective RF modulation is "effectively" 180 degrees out of phase. An optical fiber that transmits the modulated optical signal(s). A photodetector without a load resistor directly on its output that is operable at the high level of optical power, receives the modulated light and recovers the RF signal. A dual balaniced photodetector that is used in conjunction with the dual output modulator. An RF component, such as an amiplifier, that is coupled directly to an output of the photodetector that provides a load resistance for the link.

20 Claims, 5 Drawing Sheets

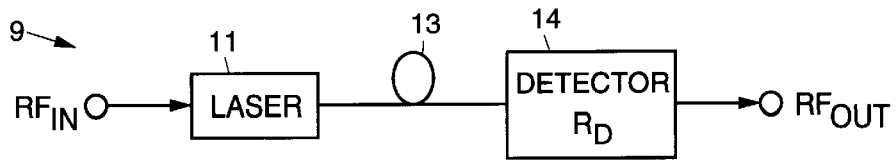
Fig. 1a
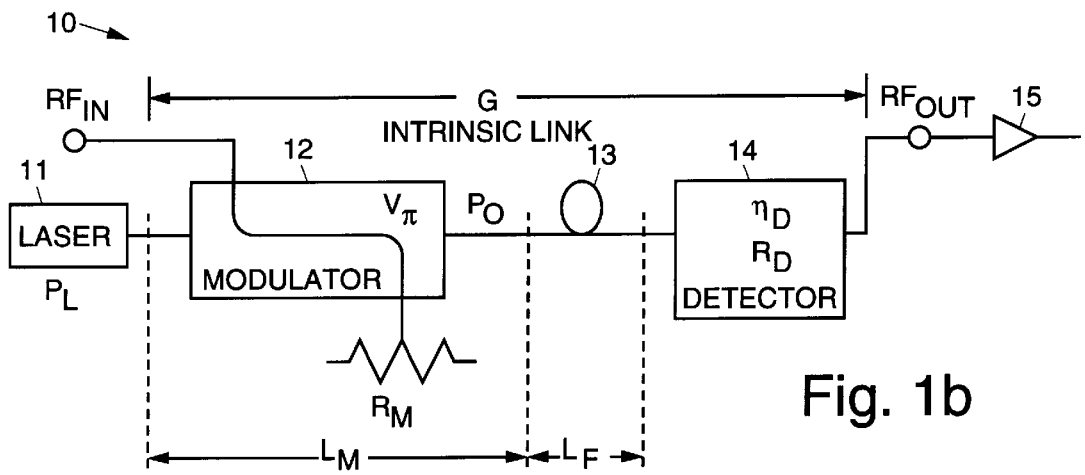
Fig. 1b
Fig. 2
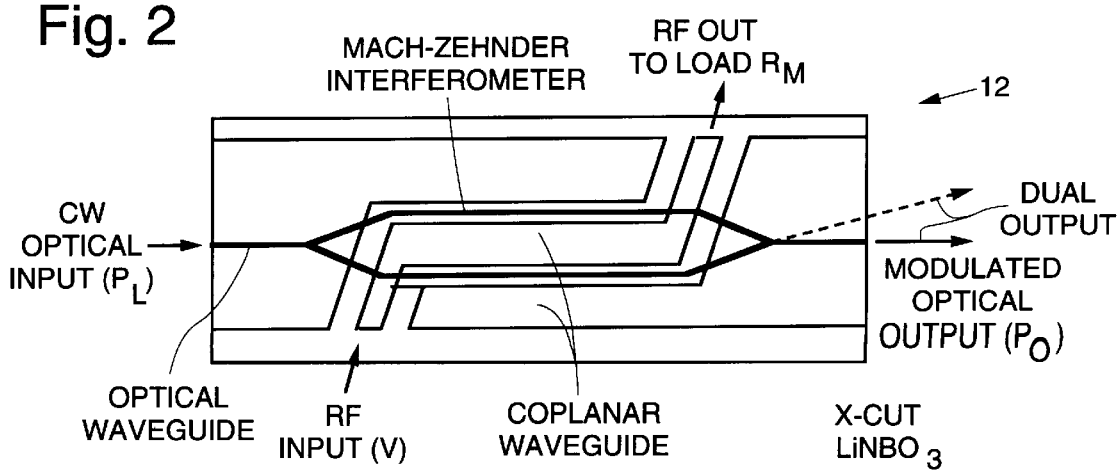

RF WIDE BANDWIDTH LOSSLESS HIGH PERFORMANCE LOW NOISE TRANSMISSIVE LINK

BACKGROUND

The present invention relates generally to transmissive RF links, and more particularly, to an improved RF wide bandwidth low loss (even gain) high performance low noise fiber optic link that can be compactly and reliably packaged.

The prior art this invention replaces relates to current commercial off-the-shelf (COTS) RF fiber optic links and current narrow bandwidth links. One disadvantage of current RF fiber optic links is that they do not meet many of the demanding RF performance parameters needed in advanced RF systems. The present invention achieves a significant leap forward in overcoming prior RF fiber optic link deficiencies.

It would therefore be an improvement in the RF systems art to have an RF wide bandwidth, low loss, high performance, and low noise optical transmissive link. It would also be an improvement in the RF systems art to have an RF wide bandwidth, low loss, high performance, and low noise optical fiber link.

SUMMARY OF THE INVENTION

The present invention provides for a high performance low noise wide RF bandwidth fiber optic link that achieves a significant improvement in key RF link parameters. The fiber optic link has a very wide bandwidth from 1 to 18 GHz and higher using currently available technology. The key link parameters addressed by improvements provided by the present invention are RF insertion loss (gain), signal-to-noise ratio, noise figure, spur free dynamic range, and close-in and far out relative phase noise.

The RF fiber optic link selectively employs a number of techniques to improve various link parameters. The link may be structured to have a high power light source, such as a laser, that provides light output having a high level of optical power. A feedback circuit may be disposed around the light source that reduces relative-intensity-noise levels produced by the light source at low frequencies. A modulator is used to modulate the light output of the light source. Preferably, a dual output modulator is used to provide two amplitude modulated optical signals whose respective outputs have RF modulation on the light output which is "effectively" 180 degrees out of phase. An optical fiber may transmit the modulated optical signal(s). A photodetector without a load resistor directly on its output that is operable at the high level of optical power receives the modulated light and recovers the RF signal. A dual balanced photodetector is preferably used in conjunction with the dual output modulator. An RF component, such as an amplifier, can be coupled to an output and integrated with a photodetector and thus provides a load resistance for the link for wide bandwidth operation.

Projected near-term key link parameters are a frequency bandwidth of 1 to 18 GHz, a link gain of at least 0 dB, a signal-to-noise ratio of 165 dBc/Hz, a noise figure of 18 dB, a spur free dynamic range of 117 dBc/Hz and a relative phase noise at 10 kHz of −135 dBc/Hz relative to an RF carrier at 10 GHz. These are achieved without the use of RF amplifiers in the input or output paths of the link. Further out in time, better link performance will be achieved as component technology improves. For comparison, current typical commercial off the shelf (COTS) link parameters without RF amplifiers exhibit a link frequency bandwidth of 1 to 18 GHz, a gain of about −45 dB, a signal-to-noise ratio of about 150 dBc/Hz, a noise figure of about 45 dB, and a spur free dynamic range of about 100 dBc/Hz, and close-in (phase) noise (at 10 kHz) of about −120 dBc/Hz.

The present invention combines several techniques for improving link performance using the latest improved link components that can now be fabricated in a laboratory. The techniques preferably include the use of: (1) laser noise reduction using a balanced photodiode detector pair, (2) a feedback circuit around the laser to reduce the significant relative-intensity-noise levels at low frequencies (<1 MHz), (3) high power handling capability photodiode detectors, (4) a high power CW semiconductor laser, (5) a dual output external modulator, and (6) a photodiode detector without a conventional 50 ohm output load resistor.

All of these techniques have been demonstrated independently but have never been put togehter to achieve a lossless high performance RF wide bandwidth low noise fiber optic link. Also, some of the techniques are known to a very limited technical community and some of the improvements in component technology have not generally been believed to be feasible.

The present invention provides a fiber optic link that can meet the demanding parameters of the latest state of the art RF systems and bring with it all the many advantages provided by fiber optics which include wide RF bandwidth, low loss in fiber, light weight, small size, no electromagnetic interference (EMI), remoting and monolithic integration. Previously, the link parameters restricted the practical use of RF fiber optic links to limited specific areas of use in RF system a (such as long delay lines). The present invention opens the use of RF fiber optics to most RF system applications and thereby provides for significant link cost reductions obtained by large usage.

One way to define the link in the present invention is as follows. Take a typical RF wide bandwidth amplifier with a gain of about 25 dB (typical for radar) that might be used in a high performance radar system front end and measure its performance parameters of bandwidth, gain, signal-to-noise ratio, noise figure, spur free dynamic range, relative close-in and far out phase noise. Now place the amplifier at the input to the fiber optic link described herein and measure the same parameters as listed above for the combination of amplifier and link. The combination will have substantially the same performance parameters as the amplifier as measured above.

The present fiber optic link may be used in current and future radar, electronic warfare and communication applications. The fiber optic link may be used in both military and commercial RF systems for ground, air, sea and space based applications.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1a is a schematic diagram of a generic analog fiber optic link employing a directly modulated laser;

FIG. 1b is a schematic diagram of a generic analog fiber optic link employing an external modulator in accordance with the principles of the present invention;

FIG. 2 illustrates an exemplary Mach-Zehnder type external modulator with a dual output;

DETAILED DESCRIPTION

Figure 3:
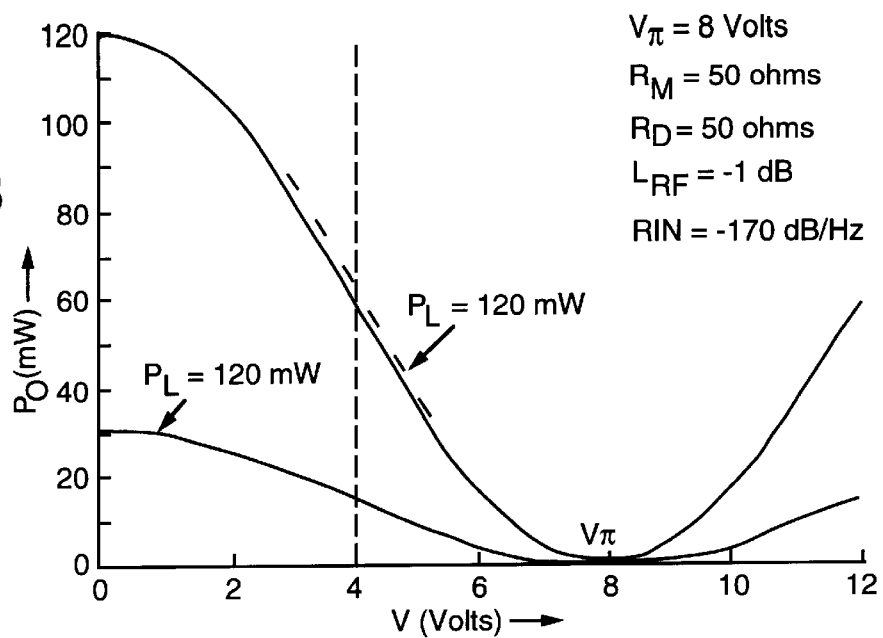
FIG. 3 is a graph that illustrates the variation of the Mach-Zehnder modulator optical output with its voltage input for the modulator of FIG. 2.

The present invention will be described with reference to a fiber optic link as a transmission medium. However, it is to be understood that the present invention is not limited to its use with only a fiber optic transmission medium. The present invention may be used with an air transmission medium or a polymer or similar substrate having waveguides embedded therein, for example.

A basic fiber optic link may be defined as an optical source that can be modulated by an electrical signal (transmitter), a means to propagate the modulated light signal output from the transmitter, and an optical detector (receiver) that demodulates the signal modulated on the light source. Thus, an RF signal is the input to the transmitter and the output from the receiver is the RF signal that is input to the transmitter and changed by the link parameters.

High performance analog fiber optic links could be utilized for many RF system application such as remoting of antennas and the development of photonic beamforming networks for phased arrays. Specifically, the key link parameters of RF-insertion loss (gain), noise figure, spur free dynamic range and signal-to-noise ratio for both directly modulated links and externally modulated links typically improve with an increase in the incident optical power on the photodetector. The present invention integrates several techniques to achieve high optical power incident on a photodetector in a fiber optic link, for example, and also improve the link relative noise, both AM and FM, or relative phase noise.

Table 1 shows current link parameters for reference and link parameters that can be obtained presently using the concepts of the present invention. For both links in Table 1, the addition of properly selected RF amplifiers provide improved RF system parameters of gain and noise figure and maintain link signal-to-noise ratio and spur free dynamic range. Table 1 shows external modulator link in the present invention versus current RF fiber optic link performance both with no RF amplifiers.

TABLE 1

| Parameters at 10 GHz (except frequency range) | Present invention | Current COTS with typically used inputs |
| --- | --- | --- |
| Frequency range (3 dB Bandwidth), GHz | 1–18 | 1–18 |
| Gain, dB | 0 | −45 |
| Signal-to-noise ratio (SNR), dBc/Hz | 165 | 150 |
| Spur free dynamic range (SFDR), dBc/Hz | 115 | 100 |
| Noise Figure, dB | 20 | 45 |
| Relative phase noise (RPN) at 10 kHz away from an RF carrier at 10 GHz, dBc/Hz | −135 | −120 |
| Optical wavelength (nanometers, nm) | 1300 or 1550 | 1300 or 1550 |
| Modulator $V_\pi$, volts | 4.5 of 5.5 | 10 or 12 |

In the data shown in Table 1, the current off the shelf (COTS) external modulator link is biased at half power, uses a 4 dB loss modulator, a 4 mW optical power input at an optical wavelength ($\lambda$) of 1550 nanometers (nm), and a photodiode detector responsivity of 0.8, and a COTS modulator with a $V_\pi$ of 12 V at 10 GHz. The relative phase noise is used since this is the primary noise from electronic oscillators. $V_\pi$ is the peak DC voltage required to drive a modulator from cutoff to maximum output, and is a figure of merit relating to modulator efficiency. Wave length can be given as nanometers or micrometers ($\mu$m), where 1000 nm equal 1 $\mu$m.

With the availability of higher power lasers in directly modulated links, very high power solid state and semiconductor diode lasers at a wavelength $\lambda=1.3$ $\mu$m and $\lambda=1.55$ $\mu$m for use with externally modulated links, improvements to the externally modulated link parameters listed in Table 1 are limited at higher RF frequencies by the photodetector when it is excited by high values of incident optical power. With the development of lower $V_\pi$ modulator (an order of magnitude lower than the $V_\pi$ in Table 1) and high frequency photodetectors that can maintain a high responsively with low intermodulation distortion at high incident optical power levels, large improvements in the current key link parameters given in Table 1 are possible using the techniques described herein.

The description provided below will first cover the general concepts of the present invention to improve key link parameters, and then describe the concepts and each key parameter in more detail. Typical examples are given for some generic link parameters shown in the various figures and tables. The improvements are primarily for externally modulated links but a few are applicable to directly modulated links.

An analog photonic link (transmitter, fiber, and receiver) can be implemented by using either direct or external modulation as the transmitting source. In the directly modulated link, the drive currently directly modulates an optical source (typically a diode laser transmitter) with the RF input to the link. In an external modulated link, the laser source is operated in a CW mode and the RF input is impressed onto its optical carrier by employing an external modulator (which is the combination of a laser and modulator as a transmitter)

After transmission over a fiber, the RF signal is recovered, for both types of links, via RF optical detection using photodiode detectors (photodetector receivers) located at the output end of the link. While a directly modulated link is simpler to implement, the external modulation technique offers more potential for achieving low RF insertion loss and high performance transmission. It is the external modulated link that has the capability to benefit the most from the use of higher power laser sources.

The key RF parameter figures of merit of such links, RF insertion gain, noise figure, spur free dynamic range and signal-to-noise ratio, all improve up to a point with increased optical power ($P_O$) incident on the photodetector. However, these improvements can be realized in practice only if the photodetector maintains its detection linearity under high doses of incident optical power, and if the link remains shot-noise rather that relative-intensity-noise limited with the higher photodetector incident optical power. Currently, laboratory-developed photodetectors will meet the above requirements at high microwave frequencies, while current COTS photodiode detectors will not.

The present invention incorporates various techniques to improve the key RF parameters of the externally modulated link. These techniques include the following: (1) The use of high level optical power (up to 100 mW) from a semiconductor distributed feedback laser and photodiode detectors that can be effectively utilize high optical power levels (in the range of 25 mW of optical power). This provides a 35 dB link gain improvement using an external modulator with a $V_\pi$ (one figure of merit of a modulator) of 4.5 volts. (2) The use of an external modulator with dual outputs (directional coupler type that has two optical outputs that have their RF modulation outputs "effectively" 180 degrees out of phase) in a dual balanced photodiode detector link to achieve a 6 dB gain improvement. (3) The use of a photodetector without a 50 ohm load resistor directly on its output. The RF output of the link is coupled directly (very close in RF terms) to an RF component that provides the link load resistance and provides a 6 dB link gain improvement. (4) Reduction of laser relative-intensity-noise using a dual balanced photodetector receiver as in item (2), so the link, is not laser relative-intensity-noise noise limited (but shot-noise limited) at frequencies relatively far from the RF carrier (>1 MHz). This dual link photodetector receiver technique is the equivalent of the electronic technique of local oscillator noise cancellation in an RF balanced mixer. (5) Use of a feedback circuit around the laser to reduce the significant relative-intensity-noise (RIN) levels out of the laser at low frequencies (<1 MHz).

The meaning of "effectively" 180 degrees out of phase means that the two outputs have amplitudes which are complementary, one goes up in amplitude when the other goes down in amplitude and the total amplitude is constant. Thus it works like 180 degree phase shift but it is independent of RF modulation frequency. This is important since it means the RF modulation is out of phase independent of instantaneous bandwidth.

For directly modulated links, items (1) (3) and (5) can be utilized.

Each of these techniques has been used individually, but in the present invention, they are combined in an externally modulated link that may have zero or even a small positive RF gain (depending on external modulator efficiency and optical power used) and also with large improvements in the other link parameters.

RIN is generated when a laser diode is biased above threshold and the emitted light exhibits small intensity fluctuations about the average value. The relative-intensity-noise is defined as the ratio of the mean square intensity fluctuations to square of the average. The low frequency relative-intensity-noise causes high noise levels that are not reduced by the balanced detector in item (4) because this noise is modulated onto the RF carrier by the modulator and appears on the output just like an RF signal input to the modulator. The balanced detector only reduces noise (either low or high frequency) not modulated onto the RF input signal that is modulated in the light, i.e., noise fed through the modulator. The low frequency noise in a laser is typically much larger than the higher frequency laser noise. Thus, the reduction in low frequency in (5) and the inherent laser very low high frequency noise plus the cancellation in (4) provide the capability to minimize laser (RIN) noise to achieve a shot noise limited link.

The combination of items (4) and (5) reduces both far-out (4) and close-in (5) link noise from the optical source that is input to the link external modulator. This combined technique for noise reduction and the explanation for their use is not well known in the art, so it is summarized in the following. There is the noise that goes directly through the modulator as feedthrough in the link output frequency range of interest (bandwidth of the link). This feedthrough noise is canceled using (4). Some of the noise, the part that does not feed through, will be mixed with the modulator input RF signal because of small nonlinearities in the modulator. The user of (4) does not get rid of that noise. This mixed noise is reduced using (5) for the close in noise. The far-out noise of a laser is typically very low in level and the mixing process in the modulator is relatively inefficient for typical modulator operation. Thus, this noise is typically not significant. Thus, utilization of higher optical power levels to achieve improved link key parameters over a wide RF link bandwidth (up to and greater than 18 GHz) are achieved.

Using the combined techniques implemented by the present invention, externally modulated links (having no RF amplifiers) can achieve parameters given in Table 1 of gain=0 dB, noise figure=20 dB, spur free dynamic range= 115 dBc/HZ$^{2/3}$ of signal-to-noise ratio=165 dBc/Hz and relative phase noise of −135 dBc/Hz at 10 kHz from the RF carrier. The signal-to-noise ratio is the ratio of the 1 dB compression signal level to the link noise floor level. These parameter values are based on laboratory external modulators with a Vt voltage of 4.5 V at 10 GHz. Using the noise reduction techniques in items (4) and (5), and using the techniques in items (1), (2) and (3), the above link parameters can be achieved over a frequency range of 1 to 18 GHz.

Links are also compared using two other parameters including a 1 dB compression point and third order intercept point. These, as well as the other key link parameters are also commonly used for specifying RF amplifiers. In fact, a fiber optic link may be analyzed as an RF black box with RF inputs and outputs and evaluated using the same parameters and measurements used to assess performance of RF amplifiers. The 1 dB compression level is the input RF power level that produces a link input versus output RF power curve that is linear to the point where the output deviates by 1 dB from being linear.

Thus, the input power level that causes the output RF power to deviate 1 dB from linear is called the 1 dB compression point and is a direct function of the modulator $V_\pi$ for optical links. For the link, with parameters given in Table 1, the 1 dB compression point is in the range of 15 to 20 dBm, depending on $V_\pi$. The third order intercept point is the input RF power level on a curve of input versus output power curve where the input versus output curve and the plot of the third order output harmonic power levels intersect. It is typically 10 dB greater than the 1 dB compression level. For this link that number is in the range of 25 to 30 dBm.

Since only the parameters that are intrinsic to the photonic link are relevant to the basic invention, the microwave amplifiers are not included in the schematic of the generic links In practice, low noise pre-amplifiers and post-amplifiers are typically employed, respectively, before the modulator and after the photodetector, and those can be used to establish the overall RF system parameters. The performance of a photonic link cascaded with microwave amplifiers can be estimated by treating the intrinsic photonic link as a standard RF component with its associated gain, noise figure, spur free dynamic range signal-to-noise ratio and relative phase noise.

Referring now to the drawing figures, FIG. 1a is a schematic diagram of an exemplary generic analog fiber optic link 9 employing a directly modulated light source 11 (laser 11). As is shown in FIG. 1a, the directly modulated fiber optic link 9 comprises a laser 11 (that can directly modulate to high frequencies), a fiber 13, and an output photodiode detector 14.

FIG. 1b is a schematic diagram of an exemplary generic analog fiber optic link 10 in accordance with the principles of the present invention employing a light source 11 (laser 11) and an external modulator 12. The laser 11 may be a distributed feedback semiconductor laser 11, a fiber laser 11 or a solid state laser 11, for example. The output photodiode detector 14 may be replaced by a single photodetector 14, or a traveling wave photodetector 14, for example. Also, other transmissive media may be employed in lieu of the fiber 13, including polymer and other material having embedded waveguides, or an air transmissive medium using lenses and a modulator output close to the detector 14.

Not shown are input and output RF matching circuits to improve link performance. RF matching circuits on both the input and output of any link (external or directly modulated) can improve link performance but may decrease link bandwidth. The present invention is concerned with externally modulated links where the largest gain in performance can be achieved, but there are improvements in performance (though not as large) that can be achieved with directly modulated links using some of these techniques.

Referring to FIG. 1b, the externally modulated fiber optic link 10 comprises a laser 11 that is operated continuously (CW) and whose output power is denoted by PL. Presently, solid state diode-pumped Nd:YAG lasers 11 (at a wavelength, λ, of 1.32 micrometers (pm) or equivalently 1320 nanometers (nm)) with a single frequency power output as high as 200 mW are commercially available. Experimental prototypes of a diode-pumped Nd:YLF laser with $P_L$ (at 1.32 μm) of 350 mW and free-spectral-range (mode-spacing) of 4.5 GHz have also been demonstrated as is discussed in "Final review of Analog Optoelectric (OE) TRP" (DARPA/Consortium Agreement MDA927-94-0016), Nov. 22, 1996, and further mode spacing can be achieved. While the output of this laser 11 is not single mode, it is sufficient for applications at L band (about 1 to 2 GHz). Given more mode spacing frequency separation, operation at higher frequencies are possible.

For more compact packaging, distributed feedback (DFB) diode lasers 11 (λ=1.3 or 1.55 μm) with a fiber-coupled $P_L$ in excess of 20 mW have also been integrated with a Mach-Zehnder (MZ) optical modulator 12 into a single transmitter unit. Given the above information on the optical sources FIG. 3 shows that the link improvements (with $P_L$) described below are achievable using a high-power and high-linearity photodetector 14 at the receiver end. In addition, an optical amplifier (now COTS available with 200 mW, 23 dBm, optical output power at x=1.5 μm) may be used to increase the optical power level when used with a distributed feedback laser 11. Distributed feedback lasers 11 in the laboratory have demonstrated optical output power levels of 60 to 100 mW out of a fiber. These optical power figures are for distributed feedback lasers 11 at λ=1.32 μm. At the λ=1.55 μm wavelength, the output power is lower. Another type of laser is a fiber laser that also can be used to supply optical power to a modulator.

In the link shown in FIG. 1b, an electro-optic modulator 12 made from Lithium Niobate ($LiNbO_3$) is typically used to impress the RF signal onto the optical carrier. Although an assortment of modulators 12 have been reported in the literature and demonstrated, the basic Mach-Zehnder modulator 12 (shown in FIG. 2) is the most popular COTS design. The complementary modulator output ($P_C$) (discussed later as a Mach-Zehnder with a directional coupler output or dual output modulator) is shown in the modulator 12 of FIG. 2 as a dashed arrow, along with the normal modulator output ($P_O$) The DC voltage $V_\pi$, in reference to a modulator, is a figure of merit for comparing modulators and calculating their performance. $V_\pi$ is the peak voltage needed to drive the modulator output optical signal from minimum (cutoff and/or extension) to maximum output.

Mach-Zehnder modulators 12 with bandwidths in excess of 20 GHz are available COTS items. Also, the optical damage threshold for these modulators 12 (at λ=1.3 μm or 1.55 μm) is in excess of 250 mW. Thus, these types of modulators 12 will be used to illustrate the benefits that can be gained via enhancements using higher input modulator optical power, $P_L$, to increase the incident power on the photodetector 14.

FIG. 2 illustrates the Mach-Zehnder $LiNbO_3$ external modulator 12. The Mach-Zehnder $LiNbO_3$ external modulator 12 has both a normal ($P_O$) and complimentary ($P_C$) outputs. If the voltage applied to the electrode of the Mach-Zehnder modulator 12 is denoted by V(t), then its modulated optical output $P_O$ is given by the following expression:

$$P_O = P_L \cos^2\left(\frac{\pi V(t)}{2V_\pi}\right) \quad (1)$$

As an example, FIG. 3 is a graph illustrating the variation of the optical output ($P_O$) of the Mach-Zehnder modulator 12 with voltage input for the modulator 12 of FIG. 2. In FIG. 3, the variation of $P_O$ with voltage (V) for an optical input ($P_L$) to the modulator 12 of 30 mW and 120 mW is plotted. In FIG. 3, the use of input voltage is in reference to the drive voltage to the modulator and how it affects output power which in this curve is a function of how the modulator is biased. In this curve, it appears that $V_\pi$ of 0 gives maximum output, where the definition of $V_\pi$ is that it is the voltage for maximum output; this occurs because of the way the curve is plotted.

Typically, for RF signal modulation, these modulators 12 are biased at $V=V_\pi/2$. The modulation efficiency of the Mach-Zehnder modulator 12 is then given by the derivative of Equation (1) at the bias voltage of $V_\pi/2$, which is:

$$\frac{\delta P_O}{\delta V} = -\frac{\pi P_L}{2V_\pi} \quad (2)$$

The above expression shows that the modulation efficiency of the Mach-Zehnder modulator 12 is proportional to its optical input $P_L$ and inversely proportional to $V_\pi$. FIG. 3 shows that the tangent to the plot (at $V=V_\pi/2$) corresponding to a $P_L$ of 120 mW is steeper than that corresponding to a $P_L$ of 30 mW. Hence, the microwave gain (G) of the link 10 will improve with enhancements in $P_L$. If the optical insertion loss of the modulator 12 and the link are, respectively, $L_M$, and $L_F$, then G is given by:

$$G = \left(\frac{P_L}{V_\pi}\right)^2 \left(\frac{\pi \eta D L_M L_F}{2}\right)^2 R_M R_D L_{RF} \qquad (3)$$

In Equation (3), $R_M$ (typically 50 ohms) and $L_{RF}$ are, respectively, the characteristic impedance and RF loss of the modulator electrode. In addition, $\eta_D$ and $R_D$ are the responsivity (~0.75 mA/mW) and load (typically 50 ohms) of the photodetector 14, respectively. These symbols and the DC bias, V, to the modulator 12 are also illustrated in the link schematic shown in FIG. 1b. Equation (3) shows that the microwave gain of the link 10 is proportional to the square of the optical output $P_L$ of the laser 11. Hence, a fourfold increase in $P_L$ would lead to a 12 dB gain increase. Rewriting Equation 3 in terms of the DC photocurrent ($I_d$) coming out of the photodetector 14 results in $$G = I_d^2 \left(\frac{\pi}{V_\pi}\right)^2 R_M R_D L_{RF} \qquad (4)$$

Figure 4:
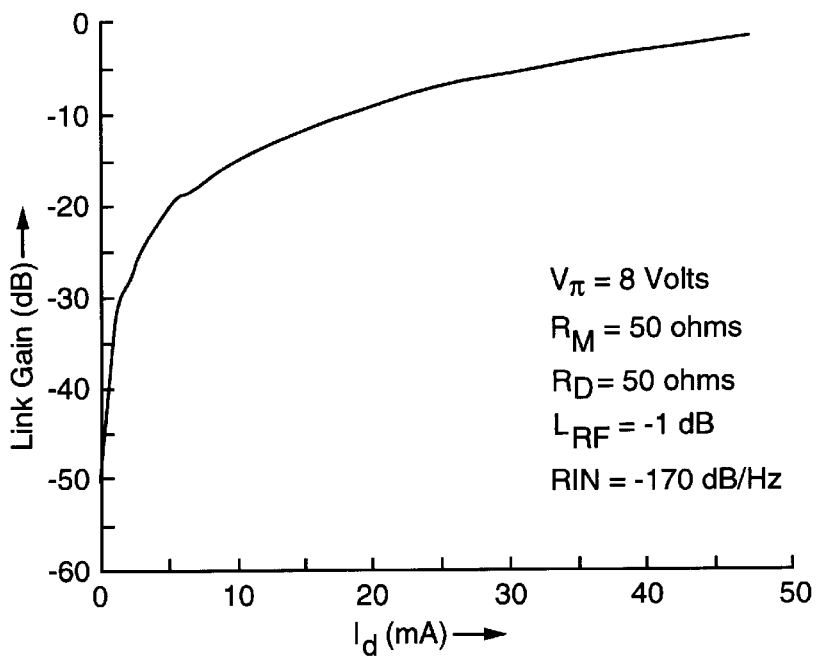
FIG. 4 is a graph that illustrates the variation of the link gain with DC photocurrent for the modulator of FIG. 2.

FIG. 4 plots the variation of the link gain (in dB) with respect to $I_d$ (in mA). From the plot, the RF insertion gain of the link 10 becomes −4 dB for an $I_d$ of ~34 mA ($P_L$ 200 mW). This is a gain of almost 17 dB in gain in comparison with a link excited by a laser 11 with only a 30 mW output ($I_d$ 5 mA), and a gain of almost 31 dB in comparison to a link excited by laser with a 6 mW output ($I_d$, 1 mA). Operation of a link 10 with 1 mA detector current is typical of many links currently in use.

Similarly, the noise figure of the link 10 improves with $P_L$ or $I_d$. In terms of $I_d$, the noise figure of the link 10 is given by the equation:

$$NF = \left(\frac{V_\pi}{\pi}\right) \frac{1}{(R_M L_{RF})(kT)} \left(RIN + \frac{2e}{I_d}\right) \qquad (5)$$

where e is the electric charge=$1.6 \times 10^{-19}$ Coulombs.

Figure 5:
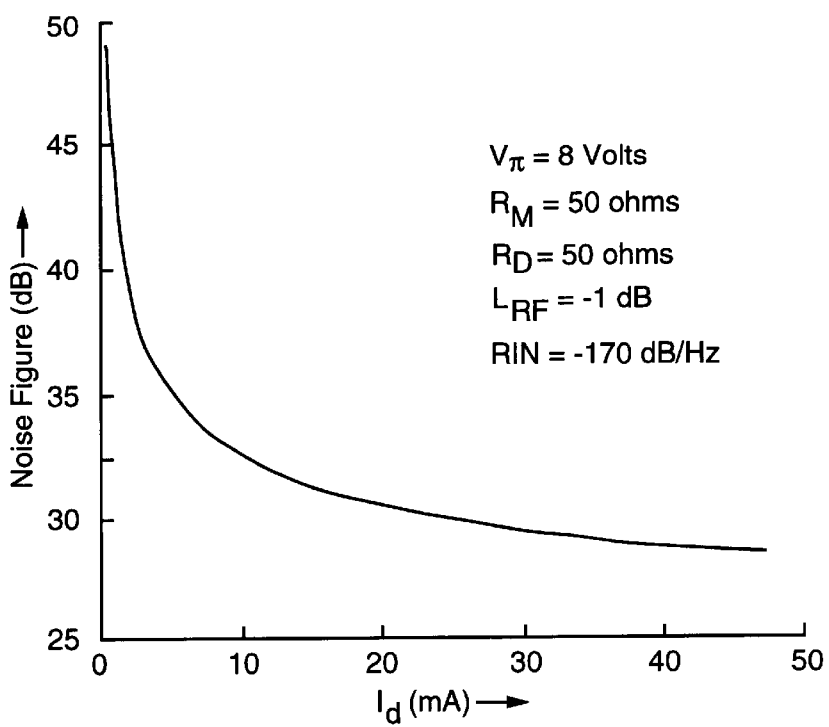
FIG. 5 is a graph that illustrates the variation of the link noise figure with DC photocurrent ($I_d$) for the modulator of FIG. 2.

In Equation (5), the relative-intensity-noise (in dB/Hz) is the relative intensity noise of the laser 11, and resistor noise is kT=−174 dB/Hz. For a well-isolated distributed feedback diode laser 11 the relative-intensity-noise is −165 dB/Hz (for frequencies above 10 MHz). However, the relative-intensity-noise of commercial diode-pumped solid state lasers 11 approaches −170 dB/Hz (for frequencies above 10 MHz). A plot of the noise figure (in dB) versus $I_d$ (in mA) according to the above Equations is shown in FIG. 5. FIG. 5 is a graph that shows the variation of the link noise figure with the DC photocurrent ($I_d$). The plot shows that the noise FIG. decreases rapidly with increases in $I_d$, and eventually approaches a floor that is set by the relative-intensity-noise of the laser 11. For a laser relative-intensity-noise of −170 dB/Hz, the noise figure is reduced by −6 dB when $P_L$ is increased from 30 mW ($I_d$ ~5 mA) to 200 mW ($I_d$ ~34 mA). For the same laser relative-intensity-noise, the floor of the noise figure is ~26 dB.

When the relative-intensity-noise of the link 10 establishes the noise floor, the link 10 is said to be relative-intensity-noise limited. As long as the link 10 is relative-intensity-noise limited, increasing the optical power will not improve link parameters (except gain). Thus, it is desirable for the link 10 to be detector shot-noise limited, so an increase in optical power will improve link parameters. The use of a balanced detector 14 to reduce relative-intensity-noise (discussed later) allows the link 10 to be shot noise limited for far-out noise, and a feedback loop around the laser 11 to reduce low frequency relative-intensity-noise (discussed later) lowers close-in noise and the combination allows the link 10 to be shot noise limited for both close-in and far-out noise. To the extent relative-intensity-noise can be decreased, the optical power can be increased and all link parameters can be improved. This increase is limited by optical power available, optical power levels that can damage the modulator 12, and power handling capability of the photodetector 14 with linear operation.

The shot noise current squared of a photodetector 14 is calculated using the equation:

$$I_S^2 = 2eI_O B \qquad (6)$$

where $I_S$ is the shot noise in amperes, e is the charge in an electron, $1.6 \times 10^{-19}$, $I_O$ is the photodetector current in amperes, and B is the noise bandwidth of the link 10. The RF shot noise power is $I_S^2$ times the link load resistance.

This noise could be a problem in some cases, particularly when high optical powers are used and the link 10 is shot noise limited. For a 1 milliampere (1 ma) detector current, the shot noise calculated using Equation (6) is −168 dBm/Hz for a 50 ohm link output load resistance directly on the photodetector 14 and no other load (as typical from the input of an RF component 15 such as an RF amplifier 15) in parallel with a 50 ohm load on the photodetector 14.

When the detector 14 is loaded by a 50 ohm load resistance and the output amplifier 15 has a 50 ohm input resistance, the output signal from the link 10 is reduced by 6 dB. Removing the 50 ohm load in a detector circuit and allowing the output RF amplifier 15 to provide a 50 ohm load for the photodiode, an increase in the RF output signal of the link 10 by 6 dB can be obtained and the noise output increases by only 3 dB, for a net gain of 3 dB in signal-to-noise ratio.

Thus, any time optical power can be increased in a shot noise limited link 10, the RF link signal-to-noise is improved by ten times the log of increase ratio of detector current. The signal power goes up by twenty times the log of detector current but the noise power goes up only by 10 times the log of the current ratio.

For links, the relative-intensity-noise (RIN) that current COTS lasers 11 can achieve are on the order of −165 to 170 dB/Hz at frequencies greater than 10 MHz. Typically, for frequencies less than 10 MHz, the relative-intensity-noise increases by $1/f^\alpha$ where f is frequency and α is an exponent that is determined by several factors. Thus, close-in RIN is the main laser noise source that is of concern, since it is much larger than RIN farther out. However, as link optical power (laser input power) increases, both close-in and far out noise increases and both can be a problem.

For the use of relative-intensity-noise reduction techniques around the laser 11, and the use of a dual detector (both described later) allows links 10 of the present invention to have much lower noise than is now typically achieved. This is needed by many current high performance RF systems. Even though this high close-in noise on the laser 11 is at a low baseband frequency and not at the frequency of interest, the close-in relative-intensity-noise on lasers 11 is a problem since it is modulated onto any RF signal carrier that is sent through the link 10. This relative-intensity-noise is not canceled using a dual detector 14. The relative-intensity-noise that is canceled is that relative-intensity-noise that feeds through the modulator 12 in the optical carrier.

Thus, there is the much higher RIN at frequencies below 1 MHz than there is at higher frequencies. The user of the dual detector will cancel the RIN that feeds through for both close-in and far out frequencies. This feedthrough RIN is the noise that is not modulated on the link RF signal inputs at frequencies for interest. For the higher close-in noise, this noise modulated onto the RF signal can be very significant and this noise can be canceled using the lower frequency (<1 MHz) feedback technique. The high frequency laser noise (>1 MHz) that is fed through is canceled by the dual detector but there is the noise that is modulated on the RF that is not canceled. However, since this far out noise is much lower than the close-in noise, it will generally not be a problem and milch of this noise will not be in the bandwidth of interest.

The laser noise modulation on the RF signal input is not generally known. Thus, the use of the dual detector alone without the cancellation due to low frequency feedback around the laser will not produce a low noise link needed for many applications. Also, the need to use lasers with very low far out RIN becomes very important.

Finally, the spur free dynamic range (in dB/HZ$^{2/3}$) of the link also improves with $P_L$. In terms of the $I_d$, the spur free dynamic range of the link 10 is given by:

$$SFDR = \left(\frac{4I_d}{2e + I \cdot RIN}\right)^{2/3} \quad (7)$$

Figure 6:
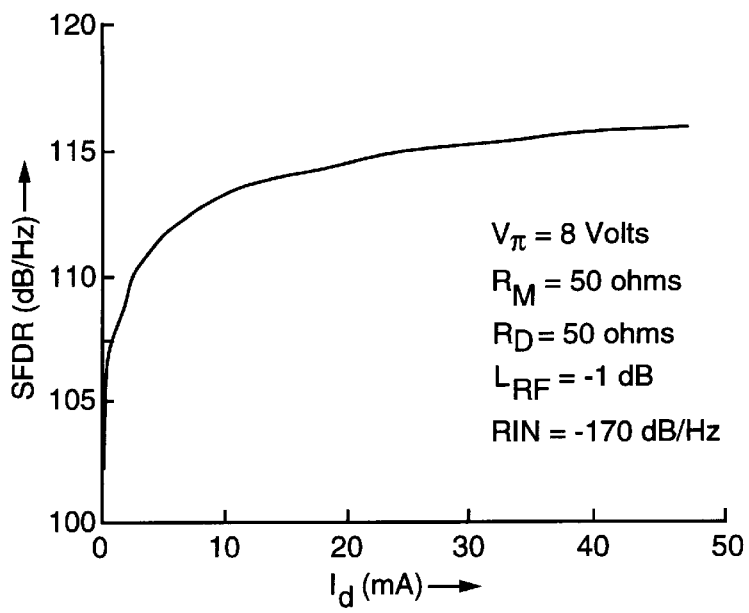
FIG. 6 is a graph that illustrates the variation of the link spur free dynamic range with DC photocurrent for the modulator of FIG. 2.

Equation (7) shows that in the shot noise dominated regime, the spur free dynamic range increases as the $\frac{2}{3}$ power of the photodetector current $I_d$. As $I_d$ increases, the component of the relative-intensity-noise starts to dominate. Eventually, the spur free dynamic range approaches a limit set by the relative-intensity-noise of the CW optical source (laser 11). A plot of the spur free dynamic range versus $I_d$ is shown in FIG. 6 where the graph illustrates the variation of the link spur free dynamic range with the DC photocurrent ($I_d$). As shown, the spur free dynamic range is enhanced by almost 4 dB as $P_L$ is increased from 30 mW ($I_d$ ~5 mA) to 200 mW ($I_d$ ~34 mA). For the parameters in FIG. 6 with the laser relative-intensity-noise of −170 dB/Hz, the best possible spur free dynamic range that one can achieve for the link 10 is −117 dB/Hz$^{2/3}$.

Table 2 compares link gain (G), noise figure (NF), spur free dynamic range (SFDR) and signal-to-noise ratio (SNR) of links 10 excited by laser power of 20 mW and 200 mW respectively to show improvement with increased optical power. Links with the parameters in FIG. 6 have a 1 dB compression of 18 dBm and a third order intercept point of 28 dBm. The 1 dB link compression (P−1 dB) is given by the equation:

P−1 dB=10 log($V_\pi$)$^2$(rms)/RM, where $R_M$ is the modulator input resistance.

These are relative comparisons for a link with the parameters as follows: $V_\pi$=8 volts, $R_M$=50 ohms, $R_D$=50 ohms, $L_{RF}$=1 dB, RIN=−170, dB/Hz (>1 MHz).

TABLE 2

| $P_d$ (mW) | $I_d$ (mA) | G (dB) | NF (dB) | SFDR (dB/HZ$^{2/3}$) | SNR (dB/Hz) |
|---|---|---|---|---|---|
| 20 | 3 | −24 | 36 | 110 | 156 |
| 2W | 34 | −4 | 29 | 115 | 163 |

The photodetector 14 has, until recently, been considered a linear element, in that its output current is directly proportional to the incident light power, for all modulation frequencies below cutoff. However, recent measurements by Hayes et al. in "Nonlinearity of p-i-n photodetectors" *IEEE Photoics Technology Letters,* Vol. 5, p. 70, 1993, and Williams et al. in "Nonlinearities in p-i-n Microwave Photodetectors," *J. Lightwvave Technol.,* Vol. 14, no. 1, pp. 84–96, Jan. 1996, show that photodetectors 14 can become nonlinear at higher optical power levels. The nonlinear properties of surface illuminated pin photodiodes can be minimized by using a traveling wave detector described next and thus allow high levels of optical power (i.e., large photodiode detector current) to be used and the link 10 can still obtain good spur free dynamic range.

Typically, fiber optic links are operated with photodetector currents of a few mA. If the current COTS photodetector diodes are operated at 50 mA currents, the nonlinearity would be very severe. An approach to reducing nonlinearity is to fabricate a waveguide-photodetector 14 whose absorption (a) per unit length can be controlled via epitaxial and waveguide design. By tailoring α, the optical power density (per unit volume of the active region) can be limited to a level that will not compromise the bandwidth or linearity of the detector 14, even though the total incident power can be very large. In this manner, the local surface current density is reduced, thereby reducing the internally-generated fields. A collateral advantage of this approach is that the local heat dissipation is also reduced, thereby allowing even higher power levels. Thus, a detector 14 can be fabricated that has the optimum thickness, lengths, and bias voltages that minimize the harmonic and intermodulation products and thus allows high optical power to be utilized in the link 10. Detectors 14 that handle higher optical power levels have been developed and tested for power levels in the 25 mW range.

A primary contention of this invention is that increasing the received optical power improves the link parameters. However, as previously mentioned limited benefits are derived from higher power because increasing optical power increases the relative-intensity-noise of the laser 11 and will cause the link to be relative-intensity-noise rather than shot-noise limited.

Figure 7:
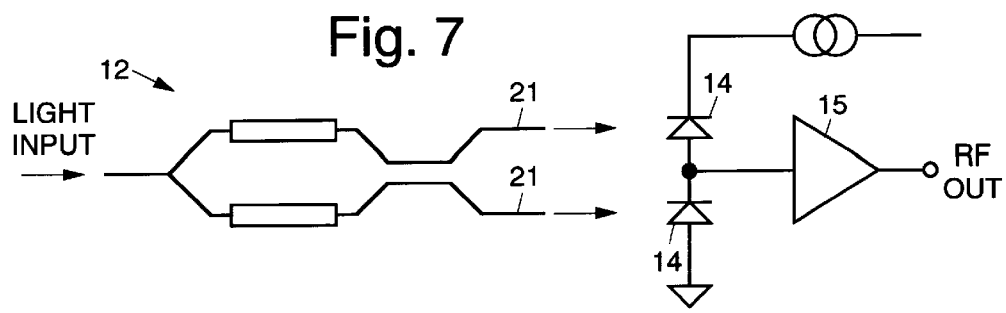
FIG. 7 illustrates a balanced receiver that provides for feedthrough relative-intensity-noise cancellation.

An approach that allows bypassing of the limit in link improvement with increased optical power for relative-intensity-noise is the noise-cancellation scheme shown conceptually in FIG. 7. A balanced Mach-Zehnder modulator with dual outputs or directional coupler modulator 12 shown in FIG. 7 that is similar to the Mach-Zehnder modulator 12 discussed previously, and has two output ports 21 that each have the RF modulation on the light output. The output RF modulation on the optical signals on the two output ports 21 are complementary (180° out of phase with each other). The complementary outputs occur because optical power is conserved, and the intensity at one output port increases when the intensity at the other decreases, which causes the RF modulated signals at each photodetector 14 to be "effectively" 180° out of phase. The photodetectors 14 are connected in such a way that common-mode signals are not passed to the amplifier 15, but differential signals (RF modulation) are. The direct feedthrough relative-intensity-noise of the laser 11, which is in-phase at each of the output ports 21, is thus rejected by this scheme, whereas the RF modulation signal which is out-of-phase at each of the output ports is added.

This particular arrangement was used to demonstrate appreciable noise suppression for a 2–18 GHz link 10 driven by a relatively noisy diode laser 11 as described by Wanuga, et al. in a paper entitled "A High Performance Fiber-Optic Link using a Y Balanced EO Modulator and Various Laser Sources," *Government Microcircuits Applications Conf.* (GOMAC), Las Vegas. Nev., Nov. 10–12. 1992, pp. 305–308. When used with a Nd:YAG solid state laser 11, however, there was no measurable improvement for the power levels used, primarily because the relative-intensity-noise of Nd:YAG lasers 11 is already so low at frequencies greater than 10 MHz. However, for higher received powers, the relative-intensity-noise of these lasers can become larger than the detector shot noise whereupon the noise-canceling properties of this technique are once again beneficial.

For many RF applications noise close-to the RF carrier (usually called I over f, I/f noise) needs to be very small. All lasers 11 currently exhibit much larger close-in relative-intensity-noise than the far-out relative-intensity-noise. This I/f close-in noise can also be canceled by a feedback technique. The use of both techniques (dual detector and feedback) provides a link 10 that has low both close-in and far-out noise. The technique for close-in noise reduction is using a feedback loop around the laser 11. This technique is described later.

Figure 8:
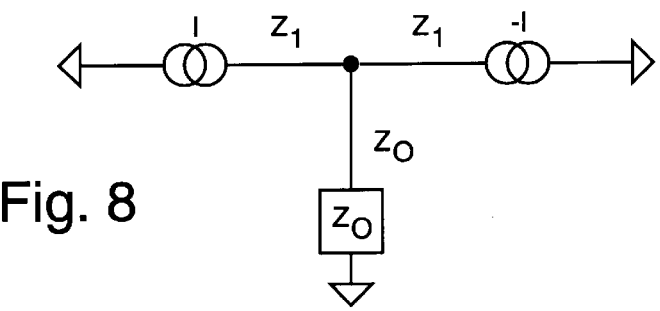
FIG. 8 illustrates an equivalent circuit of a dual-balanced detector.

Photodiode detectors 14 may be fabricated to obtain the balanced detector dual pair. Two of each of the photodetectors 14 are mounted on a dielectric substrate having the microstrip transmission line structure shown schematically in FIG. 8, which shows an equivalent circuit of a dual-balanced detector 14. In FIG. 8, the diodes are represented as pure current sources, jointly terminated by a passive resistance having the characteristic impedance, $Z_O$, of the center transmission line.

Figure 9:
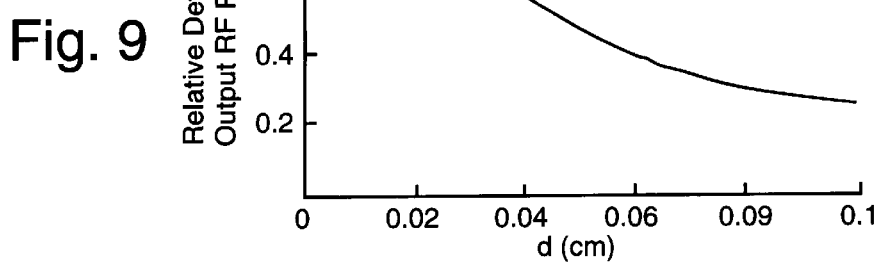
FIG. 9 illustrates a balanced receiver response as a function of detector input separation from the dual modulator outputs.

The signal voltage versus current at the terminating resistor $Z_O$ is given by $$V_S = \left( \frac{4I(\omega)Z_0 Z_1 e^{ikd}}{2Z_0(e^{ikd}-1) + Z_1(e^{ikd}+1)} \right)^{2/3} \quad (8)$$

where $I(\omega)$ is the AC current generated by each photodetector. The frequency response of this configuration is a function of the individual detector response, $I(\omega)$ and of the relative difference in distance, d, between the detector input paths and the modulator dual outputs. FIG. 9 shows the falloff in response as a function of detector relative distance separation, d, at a frequency of 20 GHz. The relative distance separation is the difference in physical length from the optical signal source (typically a dual output modulator) for each photodiode detector (typically the difference in fiber length) to the junction of the two detector outputs (see FIG. 7) where detectors 14 are joined. Thus it also includes the detector and waveguide used to join the two detectors. For good frequency response, the detector relative difference in separation distance, d, must be kept as small as possible. Also, for good noise cancellation the two detectors 14 should be matched in all characteristics (i.e., parameters such as responsivity). This distance, d, is in terms of fractions of the RF wavelengths for the non-coherent optical link operation of the present invention. For coherent optical systems the distance is in fractions of the optical wavelength which is orders of magnitude smaller than RF wavelengths.

Figure 10:
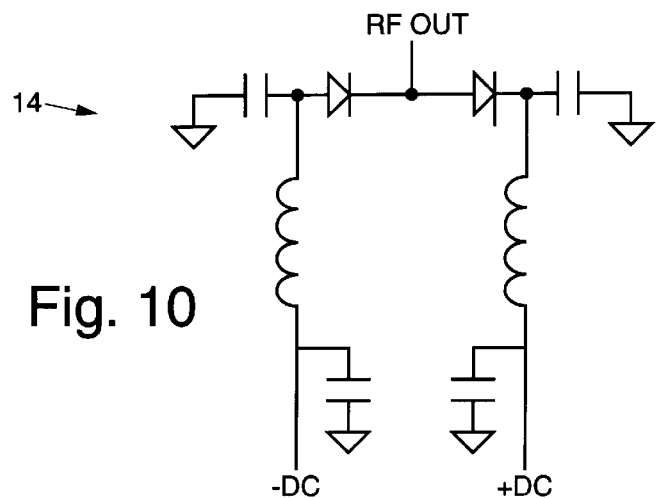
FIG. 10 illustrates a biasing and coupling arrangement for the balanced receiver.

The construction of surface-illuminated photodiode detectors 14 that may be used in the present invention allows them to be flip-chip mounted to the microstrip transmission lines, with illumination taking place through the back surface of the diode. For traveling waveguide detectors 14, some form of ribbon-bonding to the top surface, with silver-epoxy attachment on the back side may be used. These fabrication techniques have been developed that also allow DC biasing and AC coupling using the components shown in the circuit for balanced detectors 14 shown in FIG. 10. FIG. 10 shows a biasing and coupling arrangement for a balanced photodetector 14. These circuits are typically called bias tees that separate the DC and the RF signals.

This technique for relative-intensity-noise cancellation for a laser 11 also cancels the noise introduced by any optical component (i.e., an optical amplifier) that is in the input optical path to the dual output modulator 12 in FIG. 2.

If instead of using a 50 ohm resistive load for $Z_O$ in FIG. 8, the RF output in FIG. 7 is connected to a low noise post amplifier 15 that is located on the same substrate very close to the detector pair, then the input impedance (i.e., 50 ohms) at the post amplifier 15 becomes the load for the detectors 14. The closer this RF amplifier 15 is placed to the photodiode detectors 14, the less the amplitude ripple will be at the frequencies of interest; locating the amplifier 15 close by causes the ripple frequency to be higher. Short distances can move the ripple frequency to millimeter wave frequencies (i.e., greater than 50 GHz). The amplifier output impedance can be 50 ohms which is needed to match most RF components.

With the high output impedance of the detectors 14 terminated by the input impedance of the post amplifier 15, there will be a 6 dB improvement in link insertion loss, since the usual 50 ohm load on the photodiode detector 14 of the link 10 has been removed and replaced by the collocated output RF amplifier. This can also be used to improve the insertion loss (and additionally all parameters) of any fiber optic link 10 (i.e., directly or externally modulated) with a single (or dual) detector output. It is important to have either a good RF match between detecior(s) output and post amplifier input, i.e., very small mismatch or reflected power from the input impedance of the postamplifier 15 producing a very low voltage standing wave ratio (VSWR), or the two collocated very close together so the VSWR produces standing wave at a frequency out of the bandpass of interest.

This good match or closeness will minimize chase and amplitude (ripple) variations in the link overall frequency response range. It is not necessary to use a post amplifier as the load, any component located at the detector output could be used. It is also possible to use a well-matched (VSWR better than about 1.05 to 1) RF amplifier off the substrate and connected via a coaxial cable. The removal if the 50-ohm detector load can increase the link output (and gain) of both direct and externally modulated by 6 dB, with the shot noise only increasing by 3 dB for a net signal-to-noise increase of 3 dB.

Figure 11:
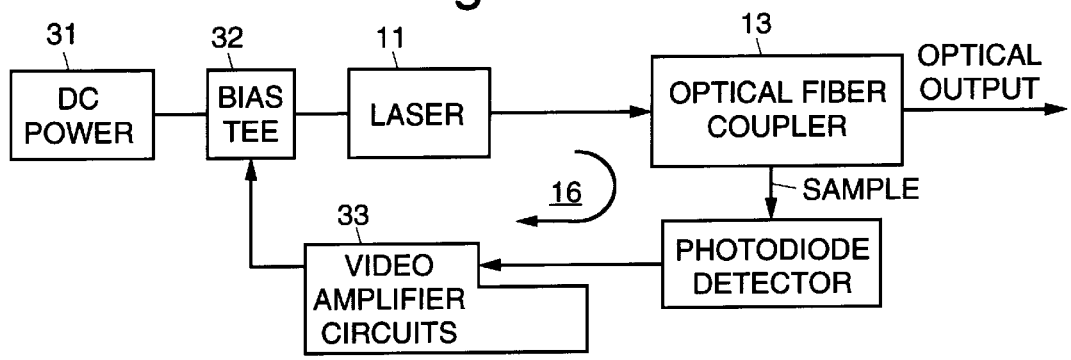
FIG. 11 illustrates feedback to cancel low frequency laser relative-intensity-noise.

The relative-intensity-noise on a laser 11 close to the carrier (<1 MHz) can be reduced by using a signal feedback technique discussed in a paper by Williams et al. entitled "Optically Amplified Downconverting Link with Shot-Noise-Limited Performance" *IEEE Photonics Technology Letters,* Vol. 8, No. 1, January 1996, p. 148, that samples the output and feeds it back 180 degrees out of phase to cancel (reduce) noise. This is performed on the optical output of the laser 11 prior to the output going to the external modulator 12. Thus, the low frequency relative-intensity-noise does not get modulated on the link input and phase noise better than −135 dBc/Hz at 10 kHz and farther away relative to an RF carrier (i.e., 10 GHz) can be achieved. FIG. 11 shows a conceptual block diagram of a feedback technique that may be used to cancel low frequency relative-intensity-noise produced by the laser 11 employed in the fiber optic link 10.

With reference to FIG. 11, DC power from a DC power source 31 is coupled to one input of a bias tee 32, where a bias tee allows the DC and RF signals to be isolated. The output of the bias tee 32 is coupled to the laser 11 to bias it. The output of the laser is transmitted over the optical fiber 13 and is sampled via an optical coupler with a small coupling ratio (so as to not lose appreciable optical power), and a low frequency photodiode detector to provide a low frequency electrical noise signal. The low frequency electrical noise signal is coupled in a feedback loop 16 using a video device 33 (video amplifier circuits 33) to a second input of the bias tee 32. The feedback signal is amplified and inverted in phase (180° phase change) and adjusted in level to cancel the low frequency laser noise. The video circuit needs to have a much larger bandwidth (>>1 MHz) in order to cancel the laser noise below 1 MHz.

The fiber optic link 10 preferably uses an external modulator 12 since more optical power can be used to obtain improved parameters. The primary type external modulator 12 is a Lithium Niobate Mach-Zehnder modulator 12, also one that has complimentary outputs. Also, both semiconductor and polymer Mach-Zehnder modulators can be used rather than the primarily used Lithium Niobate modulators.

It is also possible to use an electro-absorption semiconductor type modulator 12 to obtain complimentary outputs. The main difference is that the electro-absorption modulator 12 is similar to a photodetector 14 and one output is the modulated optical signal and the complementary output is the light absorbled, available only as an electrical current. Thus, to obtain relative-intensity-noise cancellation and addition of the modulated absorbed light, the optical output needs to be detected and combined with the electrical output using an electrical combining circuit (this circuit could be a resistive network combiner).

For example, to obtain estimated key parameters of gain, noise figure, spur free dynamic range and signal-to-noise ratio, the following data calculation can be used. Link data on gain of a COTS modulator given in FIG. 12 was used as a starting point. The curve shows a gain of about −36 dB over a 2 to 18 GHz frequency range with a photodetector current ($I_{PD}$) of 1.3 mA. This 1.3 mA current was obtained using an optical power level input to the modulator of about 8 mW (9 dBm).

Thus the following can be calculated to obtain the link parameters of 0 dB gain: (1) G=−36 dB from FIG. 12 with 1.3 mA detector current; (2) reduced loss of 6 dB using two modulator outputs and a dual photodetector 12; (3) reduced loss of 6 dB using photodetectors 14 directly coupled to a collocated matched load, typically supplied by an output RF amplifier; and (4) a reduced loss of 24 dB obtained by using an optical input power to the modulator 12 of 21 dBm or 126 mW. Thus, the total reduction in insertion loss from (2), (3) and (4) is 6+6+24=36 dB.

The detector current is increased by 16 times or is about 21 mA. The shot noise output is about −155 dBm/Hz giving noise figure of 19 dB (kT=−174 dBm/Hz). With a $V_{\pi l\ of}$ 6.5V the 1 dB compression point is about 16 dBm and the third order intercept is about 26 dBm (10 dB higher than the 1 dB compression). Thus, the spur free dynamic range is 121 dBm/Hz$^{2/3}$ and the signal-to-noise ratio is 172 dB/Hz.

Figure 12:
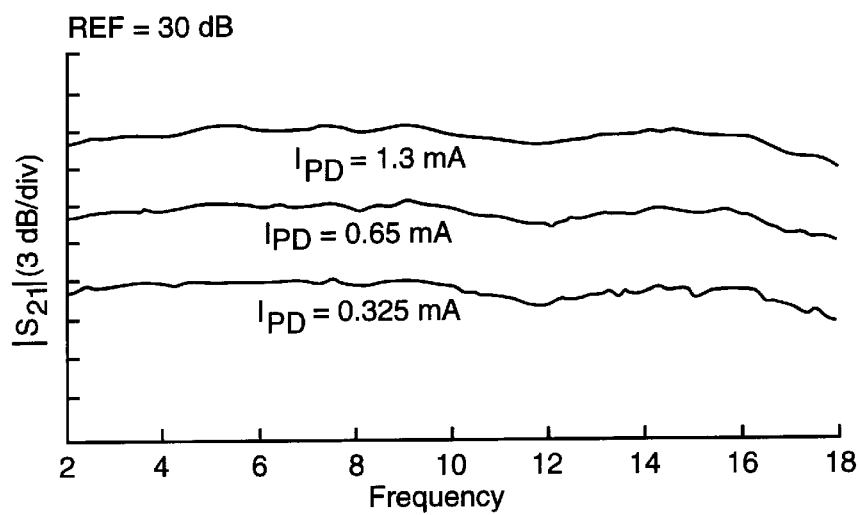
FIG. 12 is a graph illustrating measurements of a COTS modulator gain out to 18 GHz.

The COTS modulator data in FIG. 12 is for a conventional COTS Mach-Zehnder modulator 12 and not a dual output one. A dual output modulator 12 has been developed in the laboratory at the present time with similar parameters of $V_\pi$ of 6.5V and G=−36 dB for 8 mW of input optical power. The data calculated here is different than the present invention data given in Table 1 since the actual data rather than projected data for an external modulator 12 is used here.

The present invention uses the frequency range of 1 to 18 GHz since external modulators 12 with $V_\pi$ voltages that allow the link performance to be achieved are for the data given for the present invention in Table 1. The techniques of the present invention are applicable to frequencies up to 100 GHz when a modulator 12 with low $V_\pi$ similar to those COTS ones used as the basis of the invention is used with photodiode detectors 14 that can handle high power at millimeter wave frequencies up to 100 GHz. These modulators 12 are feasible in the future using polymers as the electro-optic material and the detectors are possible using traveling wave photodiode detectors 14 for higher frequency and optical power.

In many applications an optical amplifier may be used to increase the optical power out of a lower power laser. This combination of the laser 11 and optical amplifier then becomes the light source for the external modulator 12. Since the optical amplifier contributes noise to the optical output, the same techniques (dual detector for feedthrough noise and a feedback loop around the amplifier or combined laser 11 and amplifier) can be used to reduce the link noise far-out from and close-in on the resulting RF output.

The use of optical wavelengths that are not at 1300 or 1550 nm are possible and may have certain advantages. In particular, at 1050 nm the output laser power obtained from a semiconductor laser 11 can be much larger than that obtained at 1300 or 1550 nm. Thus any wavelength that offers advantages can be used in the present invention.

Downconversion of an RF signal using a fiber optic link 10 similar to that described in the Williams et al. paper entitled "Opticaily Amplified Downconverting Link with Shot-Noise-Limited Performance" can be accomplished using the technique of the present invention. The use of the technique of the present invention can improve the performance of RF downconversion discussed in the Williams et al. reference.

The present invention thus used only a iight source 11 (such as a distributed feedback semiconductor laser 11), modulator 12, optical fiber 13 and photodetector 14 to provide a lossless fiber optic link 10. Although other lasers 11 (solid state) can achieve higher powers, they are larger and much less reliable. Use of the principles of the present invention will allow a relatively small package to be achieved that can be made very reliable and able to operate over a large environmental range (because of the use of the distributed feedback laser 11, for example). Also, this will achieve a low cost lossless high performance external modulator link 10.

There are several other techniques that may be used in the link 10 described herein. (1) The use of electronic predistortion circuits or optical techniques in the link optical transmitter to achieve greater spur free dynamic range. (2) The use of detectors in parallel to increase the link optical power handling at the detector outputs. (3) With reference to FIG. 7 and its discussion, the use of electronic circuits to measure and correct the delay (and/or phase) difference between the modulator dual outputs and the detectors in order to obtain the best noise cancellation over the dual fiber outputs. (4) The use of a traveling wave phototransistor that is a combination of high power optical detectors and RF amplifier that also has the capability of allowing the mixing two input signals (one optical and the other either electrical or optical) all in one small device. (5) The technique of obtaining the increased signal output and noise cancellation with a single detector that is remotely located relative to the modulator output but with a reduction in overall wide bandwidth operation.

This technique in (5) above is described in an article by Helkey entitled "Relative-Intensity-Noise Cancellation in Bandpass External-Modulation Links", IEEE Transactions on Microwave Theory and Techniques, vol. 46, No. 12, December 1998. The technique in (5) is to add the dual optical outputs of a dual output modulator in a polarization preserving optical coupler with one modulator output having an RF 180° phase difference. The coupler and 180° phase difference are located adjacent to the modulator and the coupler output is a single fiber. The 180° RF phase difference can be provided by having one fiber length at one input to the coupler larger than the other input by a length which causes a delay to produce a 180° of RF phase difference in the RF modulation at the center of the RF frequency range of interest. The RF link bandwidth is limited because the 180° phase difference is ideally obtained for only one frequency depending on the length difference but the phase difference is close enough for nearby frequencies so as to achieve a bandwidth of about 50 percent or less.

Thus, an RF wide bandwidth lossless (or with gain) high performance low noise fiber optic link has been disclosed. This link can be best described as one that is transparent, as far as link performance (i.e., minimal performance degradation), when cascaded with a typically used RF amplifier for RF systems. The link is also one that can be reliably and compactly packaged. It is to be understood that the described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A transmission link comprising:
    a high power light source for providing light output having a high level of optical power;
    a modulator for receiving an RF signal that modulates the light output of the light source;
    a transmitting medium for transmitting the modulated optical signals;
    a photodetector without a load resistor directly on its output that is operable at the high level of optical power for receiving the modulated light and recovering the RF signal; and
    an RF component coupled directly to an output of the photodetector that provides a load resistance for the link.

2. The link recited in claim 1 which operates over a wide RF bandwidth.

3. The link recited in claim 1 wherein the light source comprises a laser.

4. The link recited in claim 2 wherein the laser is selected from the group including a distributed feedback semiconductor laser, a fiber laser, and a solid laser.

5. The link recited in claim 1 wherein the modulator is selected from the group including a Mach-Zehnder, dual output directional coupler, and an electroabsorptive type modulator.

6. The link recited in claim 5 wherein the electro optic material for the modulators are selected from a group including lithium niobate, a semiconductor, and a polymer.

7. The link recited in claim 1 wherein the transmitting medium is selected from a group including an optical fiber, an air transmission medium, and a substrate having embedded waveguides.

8. The link recited in claim 1 further comprising a feedback circuit disposed around the light source for reducing relative-intensity-noise levels produced by the light source at low frequencies.

9. The link recited in claim 1 wherein the modulator comprises a dual output modulator that modulates the light output of the light source to provide two complimentary modulated optical signals whose respective RF modulation is substantially 180 degrees out of phase.

10. The link recited in claim 9 wherein the photodetector comprises a dual balanced photodetector for receiving the two modulated complementary optical signals and recovering the RF signal.

11. A transmission link comprising:
    a high power light source for providing light output having a high level of optical power;
    a modulator for receiving an RF signal that modulates the light output of the light source to provide two modulated optical signals whose respective RF modulation is substantially 180 degrees out of phase;
    a transmitting medium for transmitting the modulated optical signals;
    a dual balanced photodetector without a load resistor directly on its output that is operable at the high level of optical power for receiving the modulated light and recovering the RF signal; and
    an RF component coupled directly to an output of the photodetector that provides a load resistance for the link.

12. The system recited in claim 11 further comprising a feedback circuit disposed around the light source for reducing relative-intensity-noise levels produced by the light source at low frequencies.

13. The system recited in claim 11 wherein the light source comprises a laser.

14. The system recited in claim 13 wherein the laser is selected from a group including a distributed feedback semiconductor laser, a fiber laser, and a solid laser.

15. The system recited in claim 11 wherein the modulator is selected from a group including a Mach-Zehnder, dual output directional coupler and an electroabsorptive type modulator.

16. The link recited in claim 15 wherein the electro optic material for the modulators are selected from a group including lithium niobate, a semiconductor, and a polymer.

17. The link recited in claim 11 wherein the transmitting medium is selected from a group including an optical fiber, an air transmission medium, and a substrate having embedded waveguides.

18. A fiber optic link comprising:
  a high power light source for providing light output having a high level of optical power;
  a modulator for receiving an RF signal that modulates the light output of the light source to provide two modulated optical signals whose respective RF modulation is substantially 180 degrees out of phase;
  an optical fiber for transmitting the modulated optical signals;
  a dual balanced photodetector without a load resistor directly on its output that is operable at the high level of optical power for receiving the modulated light and recovering the RF signal; and
  an RF component coupled directly to an output of the photodetector that provides a load resistance for the link.

19. The system recited in claim 18 further comprising a feedback circuit disposed around the light source for reducing relative-intensity-noise levels produced by the light source at low frequencies.

20. The system recited in claim 18 wherein the modulator is selected from a group including a directional coupler type modulator, a semiconductor modulator, and an electroabsorptive modulator.

* * * * *